(12) United States Patent
Tamura et al.

(10) Patent No.: US 7,472,219 B2
(45) Date of Patent: Dec. 30, 2008

(54) DATA-STORAGE APPARATUS, DATA-STORAGE METHOD AND RECORDING/REPRODUCING SYSTEM

(75) Inventors: Tetsuya Tamura, Kanagawa (JP); Hajime Nishimura, Kanagawa (JP); Takeshi Sasa, Miyagi (JP); Kazuya Suzuki, Kanagawa (JP)

(73) Assignee: Sony Corporation, Tokyo (JP)

( * ) Notice: Subject to any disclaimer, the term of this patent is extended or adjusted under 35 U.S.C. 154(b) by 196 days.

(21) Appl. No.: 11/458,204

(22) Filed: Jul. 18, 2006

(65) Prior Publication Data

US 2007/0019315 A1 Jan. 25, 2007

(30) Foreign Application Priority Data

Jul. 25, 2005 (JP) ............................ P2005-215104

(51) Int. Cl.
*G06F 12/00* (2006.01)
(52) U.S. Cl. ........................ 711/103; 711/118; 711/119; 711/122
(58) Field of Classification Search ................. 711/103, 711/118, 119, 122
See application file for complete search history.

(56) References Cited

U.S. PATENT DOCUMENTS

| | | | | |
|---|---|---|---|---|
| 5,959,948 A | * | 9/1999 | Oshima | 380/228 |
| 2007/0009225 A1 | * | 1/2007 | Yokota et al. | 386/52 |
| 2007/0031122 A1 | * | 2/2007 | Yamagata et al. | 386/95 |
| 2007/0297304 A1 | * | 12/2007 | Mawatari et al. | 369/53.12 |

* cited by examiner

*Primary Examiner*—Reginald G Bragdon
*Assistant Examiner*—Mehdi Namazi
(74) *Attorney, Agent, or Firm*—Sonnenschein Nath & Rosenthal LLP

(57) ABSTRACT

A data-storage apparatus, a data-storage method and a recording/reproducing system are provided, which effectively use the time elapsing before data is transferred to be written in a recording medium, such as disc-seeking time and disc-rotation standby time, thereby to raise the speed of transferring data. A hybrid storage apparatus has two storage areas, i.e., a disc and a nonvolatile solid-state memory. The disc and the memory have a disc cache area, a system area, and a user area each. If data is transferred from the host apparatus, it is written into the cache area of the nonvolatile solid-state memory that can be accessed at high speed for the first super cluster. While the data being so written, the head is moved to a prescribed position. Any data coming after the head is moved to this position is written into the cache area.

17 Claims, 15 Drawing Sheets

| Cluster address | FAT item |
|---|---|
| 12340h | 12341h |
| ⋮ | ⋮ |
| 1234Fh | 12350h |
| 12350h | 12351h |
| ⋮ | ⋮ |
| 1237Eh | 1237Fh |
| 1237Fh | EOF |

Set Write File Parameter: Register content at the time of issuing a command

| bit | 7 | 6 | 5 | 4 | 3 | 2 | 1 | 0 |
|---|---|---|---|---|---|---|---|---|
| Command | XXh | | | | | | | |
| Features | na | | | | | | | |
| Sector Count | na | | | | | OP | CP | IP |
| Sector Number | File length(7:0) | | | | | | | |
| Cylinder Low | File length(15:8) | | | | | | | |
| Cylinder High | File length(23:16) | | | | | | | |
| Device/Head | Obs | Na | obs | DEV | na | MLT | QW | DMA |

FIG.5B

Set Write File Parameter: Register content at the time of ending a command

| bit | 7 | 6 | 5 | 4 | 3 | 2 | 1 | 0 |
|---|---|---|---|---|---|---|---|---|
| Error | na | na | Na | na | na | ABRT | na | na |
| Sector Count | Recorded-start cluster address(7:0) | | | | | | | |
| Sector Number | Recorded-start cluster address(15:8) | | | | | | | |
| Cylinder Low | Recorded-start cluster address(23:16) | | | | | | | |
| Cylinder High | Recorded-start cluster address(31:24) | | | | | | | |
| Device/Head | obs | na | Obs | DEV | na | na | na | na |
| Status | BSY | DRDY | Na | na | na | na | na | ERR |

One super cluster

Logical sector space

|  | Size(KB) |  |
|---|---|---|
| Sector | 0.5 |  |
| Cluster | 8 |  |
| Super cluster | 128 |  |
|  | Size(B) | Real data size(KB) |
| Page(Large Block) | 2112 | 2 |
| Page(Small Block) | 528 | 0.5 |
|  | Average time($\mu$s) | Longest time($\mu$s) |
| Large Block(128KB) |  |  |
| Erasure time | 2000 | 4000 |
| Programming time | 200 | 700 |
| Cell Array→Register time | 25 | 25 |
| Small Block(16KB) |  |  |
| Erasure time | 2000 | 10000 |
| Programming time | 200 | 1000 |
| Cell Array→Register time | 25 | 25 |

FIG. 11A

|  | Time for transferring one page (μs) | | Time for transferring 128 KB (ms) | | Time for transferring 16 KB (ms) | |
|---|---|---|---|---|---|---|
|  | Average time | Longest time | Average time | Longest time | Average time | Longest time |
| Page (Large Block) | | | | | | |
| Write (Programming) time | 305.9 | 805.9 | 19.5776 | 51.5776 | 2.4472 | 6.4472 |
| Read time | 130.9 | 130.9 | 8.3776 | 8.3776 | 1.0472 | 1.0472 |
| Page (Small Block) | | | | | | |
| Write (Programming) time | 226.7 | 1026.7 | 58.0352 | 262.8352 | 7.2544 | 32.8544 |
| Read time | 51.7 | 51.7 | 13.2352 | 13.2352 | 1.6544 | 1.6544 |

FIG.11B

Set Write File Parameter:Register content at the time of issuing a command

| bit | 7 | 6 | 5 | 4 | 3 | 2 | 1 | 0 |
|---|---|---|---|---|---|---|---|---|
| Command | | | | 6Ch | | | | |
| Features | OP | IP | MP | HI | CP | | rsv | |
| Sector Count | | | File length(7:0) | | | | | |
| Sector Number | | | File length(15:8) | | | | | |
| Cylinder Low | | | File length(23:16) | | | | | |
| Cylinder High | | | File length(31:24) | | | | | |
| Device/Head | obs | SCT | obs | DEV | na | na | MLT | DMA |

FIG.13

DATA-STORAGE APPARATUS, DATA-STORAGE METHOD AND RECORDING/REPRODUCING SYSTEM

CROSS REFERENCE TO RELATED APPLICATIONS

The present invention contains subject matter related to Japanese Patent Application JP 2005-215104 filed in the Japanese Patent Office on Jul. 25, 2005, the entire contents of which being incorporated herein by reference.

BACKGROUND OF THE INVENTION

1. Field of the Invention

The present invention relates to a data-storage apparatus and a data-storage method, which manage and store various data items such as AV data, in the form of files, under the control of a host apparatus, and to a recording/reproducing system which has a host apparatus and a data-storage apparatus. More particularly, the invention relates to a data-storage apparatus and a data-storage method, which has a recording medium such as disc on which the data-transfer rate changes in accordance with the data-access position, and a recording/reproducing system.

2. Description of the Related Art

The FAT file system is a file system for use in external storage apparatuses provided in host apparatuses such as personal computers (PCs). Among the external storage apparatuses are hard disc drives (HDDs) and recording media each having a nonvolatile solid-state memory (e.g., Memory Stick (trademark) manufactured by Sony, Smart Media (trademark) manufactured by Toshiba, Compactflash (trademark) manufactured by San Disk, and multimedia cards).

The FAT file system uses two data items. The first data item is a file allocation table (FAT) that shows where on a recording medium individual files are recorded. The second data item is a directory item that shows where in the directory the files and their attributes exist.

Generally, the recording medium has two areas, one dedicated to the FAT and the other dedicated to the route directory. The PC receives the information necessary to access any file, from a recording/reproducing apparatus through a PC interface (e.g., small computer-system interface (SCSI), integrated drive electronics (IDE), IEEE1394, universal serial bus (USB), or the like). The PC then controls the recording/reproducing on the basis of the information it has received.

When a file is written in, for example, an HDD, it is recorded in an empty cluster. Upon completion of the file writing, information representing which cluster will be used next is written in the FAT. To erase the file, the data written is preserved, and the FAT item corresponding to the cluster used is rendered an empty cluster. To read the file, the start cluster address of the file is obtained from the directory item. The FAT item that corresponds to the start cluster address is read. From the FAT item thus read, it is determined which cluster contains the data file to be read. The data file is then read from the recording medium.

To transfer data between the host apparatus and the HDD, a disc cache apparatus may temporarily store the information to be written in the hard disc or the information read from the hard disc. The speed of accessing the hard disc can then be apparently increased. As in the technique described in Patent Document 1 (Jpn. Pat. Appln. Laid-Open Publication No. 11-45210), a nonvolatile semiconductor memory, such as a flashEEPROM (electrically erasable and programmable read only memory), may be used as cache. In this case, the content of the cache does not have to be written back into the hard disc before the power switch is turned off. This would be very convenient.

SUMMARY OF THE INVENTION

Here arises a problem, however. If the storage apparatus is constituted by only a nonvolatile solid-state memory as in the technique described in Patent Document 1, its manufacturing cost will inevitably increase.

In a recording/reproducing apparatus using such an FAT file system, it takes several seconds before data can be transferred, when the HDD is activated anew or when the operating mode is switched from the power-saving mode to the ordinary mode. Further, a time in units of 10 ms is necessary for the seek operation in the HDD. Hence, the HDD is not able to immediately start writing data or reading data. Moreover, the application demands that the data-transfer speed be raised even more.

To solve this problem, the disc rotation speed in the HDD may be raised, the linear recording density may be increased, or two or more heads may be used to read or write data at the same time. Any one of these methods is hardly employed in HDDs that are provided as consumer-use apparatuses.

There is a demand for techniques that can easily back up the information for managing the data written in HDDs or nonvolatile solid-state memories, or other important information.

The present invention has been made in view of the foregoing. It is desirable to provide a data-storage apparatus, a data-storage method and a recording/reproducing system, which effectively use the time elapsing before data is transferred to be written in a recording medium, such as disc-seeking time and disc-rotation standby time, thereby to raise the speed of transferring data from a host apparatus.

A data-storage apparatus according to an embodiment of the present invention has: a recording medium having a first area for temporarily storing data transferred from a host apparatus; a nonvolatile solid-state memory having a second area for temporarily storing the data transferred from the host apparatus; and a control means for performing a control to write the data transferred from the host apparatus, temporarily in the recoding areas of the recording medium and the nonvolatile solid-state memory. The recording areas includes a first write area composed of first and second areas for temporarily storing the data transferred from the host apparatus, a second write area having a third area to which data is transferred more slowly than to the first area, and a third write area having logical block addresses recorded in an area of the recording medium and an area of the nonvolatile solid-state memory. The control means performs a control for writing the data transferred from the host apparatus, in the first write area, the second write area or the third write area, in accordance with a command transferred from the host apparatus and instructing the data recording.

A data-storage method according to an embodiment of the present invention includes the steps of: transferring data from a host apparatus; and writing the data transferred from the host apparatus into a first write area, a second write area or a third write area in accordance with a command instructing that the data transferred from the host apparatus be recorded. In the method, the first write area is composed of a first area provided on a recording medium and a second area provided in a nonvolatile solid-state memory, the second write area includes a third area in which data is transferred more slowly than in the first area, and the third write area has logical block addresses recorded in a prescribed area of the recording medium and a prescribed area of the nonvolatile solid-state memory.

A recording/reproducing system according to an embodiment of the present invention has a host apparatus and a data-storage apparatus that accesses a recording medium under control of the host apparatus, thereby to write and/or read data into and from the recording medium. The data-storage apparatus has: a recording medium having a first area for temporarily storing data transferred from a host apparatus; a nonvolatile solid-state memory having a second area for temporarily storing the data transferred from the host apparatus; and a control means for performing a control to write the data transferred from the host apparatus, temporarily in the recoding areas of the recording medium and the nonvolatile solid-state memory. The recording areas includes a first write area composed of first and second areas for temporarily storing the data transferred from the host apparatus, a second write area having a third area to which data is transferred more slowly than to the first area, and a third write area having logical block addresses recorded in an area of the recording medium and an area of the nonvolatile solid-state memory. The control means performs a control for writing the data transferred from the host apparatus, in the first write area, the second write area or the third write area, in accordance with a command transferred from the host apparatus and instructing that the data transferred from the host apparatus be recorded.

In the data-storage apparatus and data-storage method according to an embodiment of the present invention, logical block addresses are recorded in an area of the recording medium and in an area of the nonvolatile solid-state memory. Hence, the management information for managing the data written in the recording medium or the nonvolatile solid-state memory, and important data items can be reliably secured.

In the recording/reproducing system and a method according to an embodiment of the present invention, a hybrid storage apparatus is used, which has a recording medium and a nonvolatile solid-state memory. The recording medium and the nonvolatile solid-state memory have a first write area each. The first write area is composed of first and second areas for temporarily storing the data transferred from the host apparatus. Data transferred from the host apparatus is temporarily stored in the first write area. The data written in the first write area is transferred, at a predetermined timing, to the second write area including the third area in which the data transfer speed is lower than in the first area of the recording medium, thereby to open the first write area. Thus, the nonvolatile solid-state memory that can be accessed at high speed and the recording medium into which data can be written fast can be used in combination. Then, data can be written and read at high speed. If the recording medium is a disc and if the head part of the data transferred is written in the nonvolatile solid-state memory, the disc-seeking time and disc-rotation standby time can be effectively utilized.

Data can be written at high speed without increasing the load by, for example, using a buffer in the host apparatus. Therefore, it is possible to provide a recording/reproducing system that is suitable for use in household apparatuses, such as digital cameras, in which far more data is written than is read out.

BRIEF DESCRIPTION OF THE DRAWINGS

FIG. 2B is a diagram showing an example of a FAT;

FIGS. 5A and 5B are diagrams showing an example of a command (Set Write File Parameter), FIG. 5A illustrating the content a register has at the time when a command is issued, and FIG. 5B illustrating the content the register has at the time when the command is completely executed;

FIG. 11A is a diagram showing two different blocks in a NAND flash memory and the page-size parameters stored in the flash memory, and FIG. 11B is a diagram showing data-transfer speeds calculated from the parameters shown in FIG. 11A;

FIG. 13 is a diagram showing another example of Set Write File parameters.

DETAILED DESCRIPTION OF THE PREFERRED EMBODIMENTS

An embodiment of the present invention will be described in detail, with reference to the accompanying drawings. The embodiment is applied to a recording/reproducing system that includes a storage apparatus (hereinafter referred to as hybrid storage apparatus) and a host apparatus connected thereto. The hybrid storage apparatus has a rotating recording medium (hereinafter referred to as disc) and a nonvolatile solid-state memory. The disc is, for example, a hard disc.

The hybrid storage apparatus according to this embodiment has two storage areas (recording areas), i.e., the disc and the semiconductor solid-state memory. The hybrid storage apparatus may write data in, and read data from, the two storage areas, in parallel or at the same time, thereby increasing the data-transfer speed. The outer circumferential area of the disc, at which the data-transfer speed is high, is allocated as a cache, i.e., the first area, in which data can be temporarily written. The inner circumferential area of the disc is allocated as the third area, i.e., a system area and a user area. The nonvolatile solid-state memory is used as the second area, i.e., another cache in which data to be transferred can be temporarily stored, or the fourth area, i.e., a storage apparatus that stores data to be transferred. Whether the nonvolatile solid-state memory is used as the second or fourth area depends on the operating state. For example, the nonvolatile solid-state memory is used as cache during the seeking time for writing data in the cache area of the disc, or during the disc-rotation standby time. Only the head data in the file may be stored in the nonvolatile solid-state memory. Then, data can be read from the nonvolatile solid-state memory during the seeking time or the disc-rotation standby time. Thus, the nonvolatile solid-state memory is used in combination with the disc, and data can be transferred at high efficiency even during the disc-seeking time or the disc-rotation standby time.

Nonvolatile solid-state memories are used in, for example, memory cards. They may be, for example, NAND flash memories that receive and supplies data in units of blocks. Of the speeds with which data is transferred to and from, for example, one nonvolatile memory chip in the present embodiment, the data-writing speed is assumed to be lower than the speed with which data is written into the disc, and the data-reading speed is assumed to be almost equal to the speed with which data is read from the disc.

The recording/reproducing system employs an MS-DOS compatible FAT file system. Nonetheless, any other FAT file system can be used so long as it can manage the data as files. The hybrid storage apparatus used in the present embodiment is one that has a magnetic recording medium such as a hard disc. Instead, it may of course be any other random-accessible recording medium such as an optical disc, e.g., CD or DVD. Similar processes can be performed on the optical disc.

Figure 1:
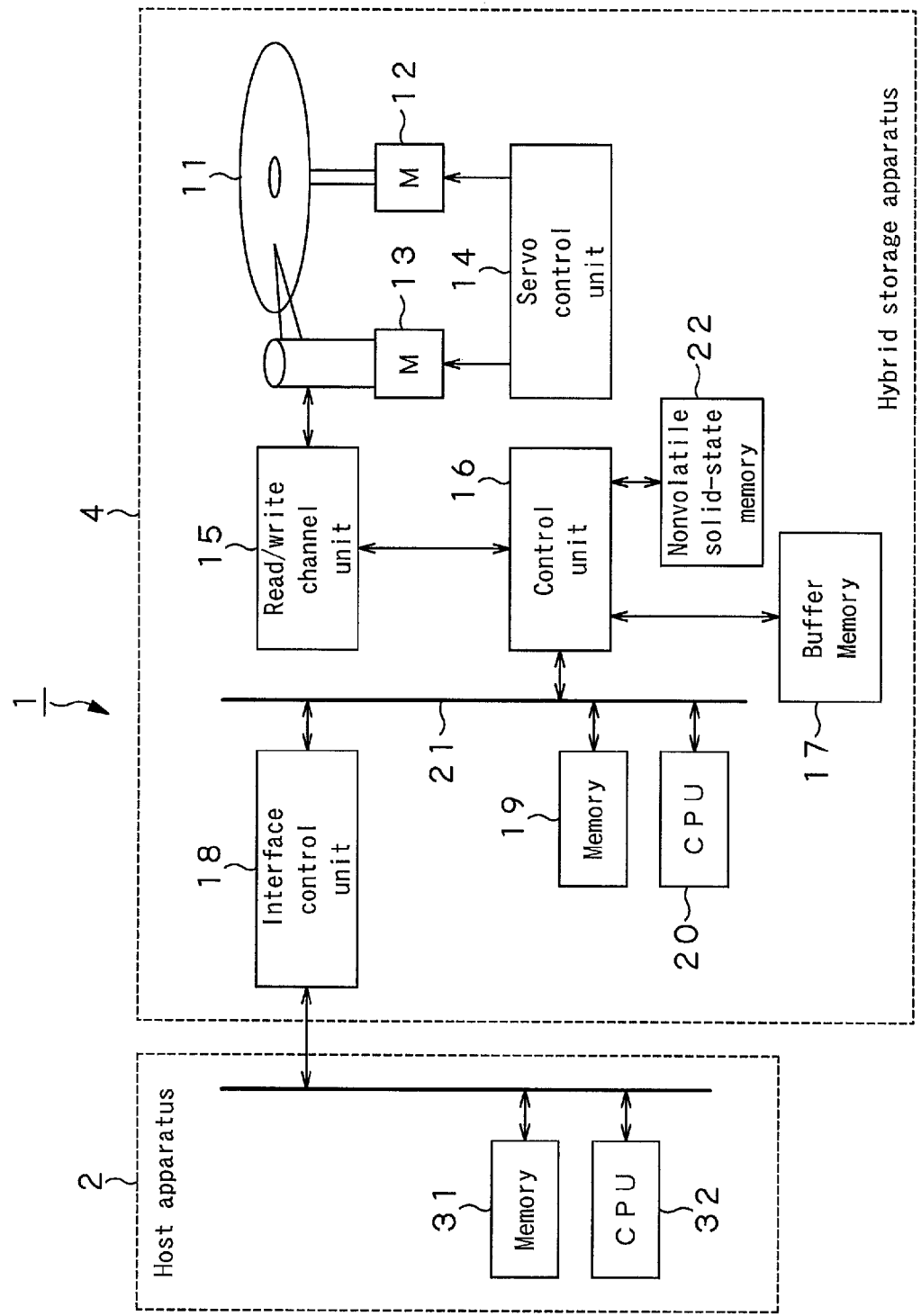
FIG. 1 is a block diagram showing a recording/reproducing system according to an embodiment of the present invention.

FIG. 1 is a block diagram showing the recording/reproducing system according to the present embodiment. As shown in FIG. 1, the recording/reproducing system 1 includes a host apparatus 2 and a hybrid storage apparatus 4. The host apparatus 2 is, for example, a personal computer (PC) or an AV apparatus. The hybrid storage apparatus 4 is connected to the host apparatus 2 by an interface 3, which may be integrated drive electronics (IDE), a small computer-system interface (SCSI), a fiber channel (FC), a universal serial bus (USB), or the like.

The hybrid storage apparatus 4 records various data items output from the host apparatus 2 in the recording area of a disc 11, i.e., rotating recording medium such as a hard disc, or in the storage area of a nonvolatile solid-state memory 22. The hybrid storage apparatus 4 has the disc 11, a spindle motor 12, a voice-coil motor 13, a servo control unit 14, and a read/write channel unit 15. The spindle motor 12 drives the disc 11, rotating the same. The voice-coil motor 13 feeds magnetic heads (not shown) for reading and writing signals from and in the disc 11, in a radial direction of the disc 11. The servo control unit 14 controls the spindle motor 12 and the voice-coil motor 13. The read/write channel unit 15 encodes data to be written in the disc 11 and decodes the data read from the disc 11.

The hybrid storage apparatus 4 further has a hybrid-storage apparatus control unit 16, a buffer memory 17, an interface control unit 18, a memory 19, and a central processing unit (CPU) 20. These components 16 to 20 are connected by a bus 21. The hybrid-storage apparatus control unit 16 manages the data recorded in the disc 11 and nonvolatile solid-state memory 22. The buffer memory 17 performs buffering on the data read from the disc 11 and nonvolatile solid-state memory 22 and on the data to be written into the disc 11 and nonvolatile solid-state memory 22. The interface control unit 18 constitutes an input/output circuit for data, control command, etc. that are received from and transmitted to the host apparatus 2. The memory 19 stores the content recorded in the disc 11 or the FAT area of the nonvolatile solid-state memory 22. The CPU 20 controls the other components 16 to 19. The nonvolatile solid-state memory 22 connected to the hybrid-storage apparatus control unit 16 is used as disc cache as described above.

In the hybrid storage apparatus 4, the interface control unit 18 receives a command from the host apparatus 2 via the interface 3. The interface control unit 18 determines the content of the command and informs the CPU 20 (provided in the apparatus 4) of the content of the command. The CPU 20 sets commands and parameters necessary for the hybrid-storage apparatus control unit 16, read/write channel unit 15 and servo control unit 14, on the basis of the content of the command. Thus, the CPU 20 causes these units 14, 15 and 16 to operate.

The servo control unit 14 controls the spindle motor 9 and the voice-coil motor 11. So controlled, the spindle motor 9 and the voice-coil motor 11 move the heads to prescribed tracks and sectors provided on the disc 11.

The read/write channel unit 15 receives the user data to be written in the disc 11 and encodes (modulates) it to a digital bit train that is fit to the characteristics of the recording/reproducing system. The unit 15 receives a signal read and reproduced by the head, removes high-band noise from the signal and converts the signal to a digital signal. The unit 15 further performs maximum likelihood decoding on the digital signal, thereby inferring the data. Then, the unit 15 demodulates the signal, thus reproducing the user data.

The hybrid-storage apparatus control unit 16 manages the transfer of data between the buffer memory 17, the nonvolatile solid-state memory 22, the read/write channel unit 15 and the interface control unit 18. The unit 16 performs a process related to the formatting of data. It also performs other processes related to encoding, error detection and error correction that are accomplished by using error-connection codes.

The data transferred from the host apparatus 2 is stored in the hard disc 11 or the nonvolatile solid-state memory 22. At this time, or at the readout time, the buffer memory 17 temporarily stores the data. Namely, it is used to suppress the decrease in performance, which results from the difference in data-transfer speed.

In the host apparatus 2, the central processing unit (CPU) 32, which has secured a work area in the memory 31, performs a process, giving various commands to the hybrid storage apparatus 4 in accordance with the instructions supplied from a higher-order controller.

In this process, the CPU 32 up-loads into the memory 31 the data stored in the boot area, FAT area and directory area. This data is the management data recorded in the system-entry area of the disc 11 during a predetermined process sequence performed when the power switch is turned on. The CPU 32 sets parameters based on the data thus up-loaded, thereby outputting various commands.

Figure 2A:
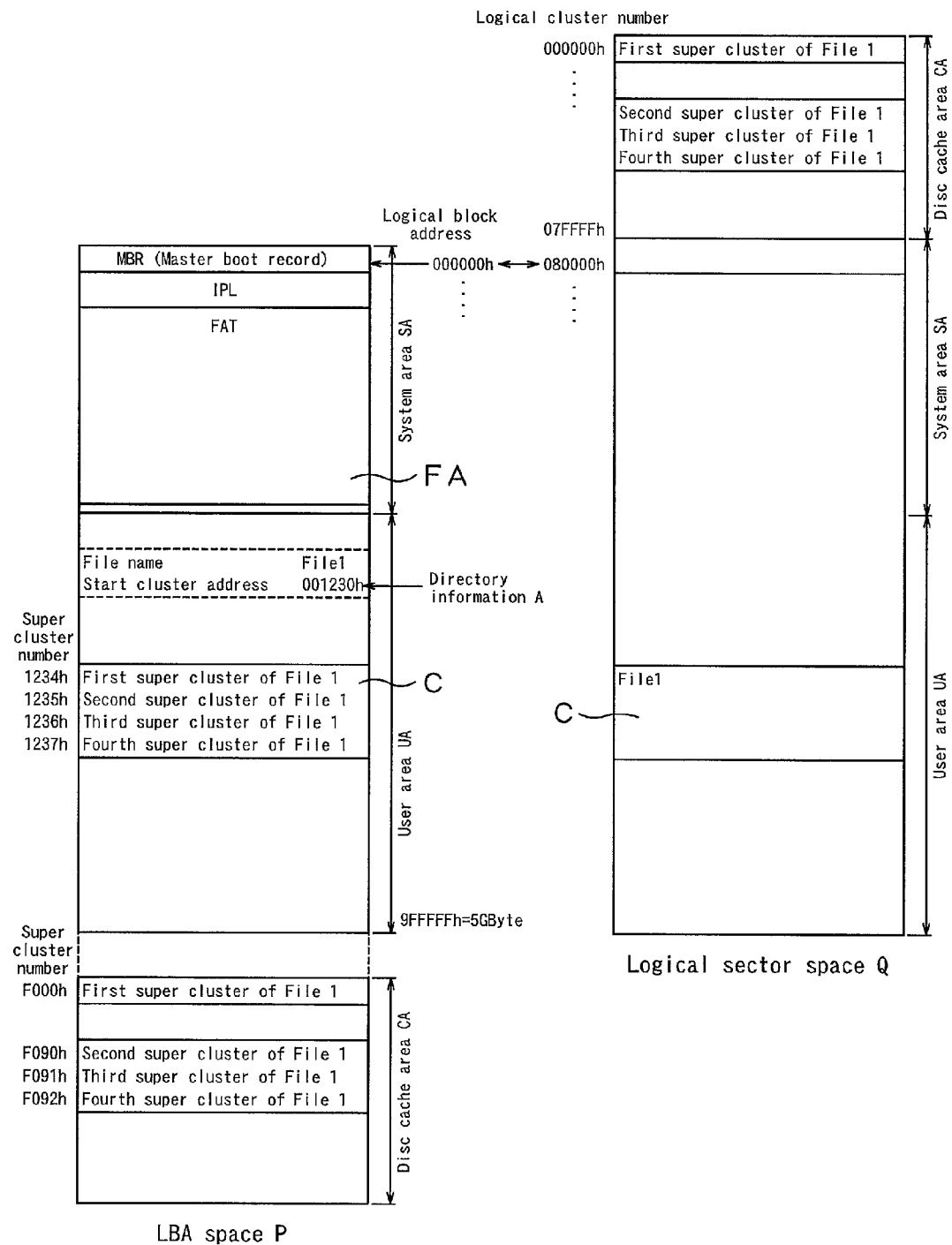
FIG. 2A is a diagram illustrating an LBA space in the left half and a logical-sector space in the right half, the LBA space being the address space viewed from a host apparatus, and the logical-sector space being the address space viewed from a hybrid storage apparatus.

A method of managing data in the present embodiment will be explained. The data recorded in the disc 11 is managed in an address space provided in the host apparatus 2 and in a different address space provided in the hybrid storage apparatus 4. The left half of FIG. 2A illustrates an LBA space P that is the address space viewed from the host apparatus 2. The right half of FIG. 2A illustrates a logical-sector space Q that is the address space viewed from the hybrid storage apparatus 4.

The storage area provided in the hybrid storage apparatus 4 is the sum of the storage area of the disc 11 and that of the nonvolatile solid-state memory 22. In these storage areas, the smallest unit of data-recording area is called sector. The size of the file system uses a file allocation table (FAT) that shows how files are stored in clusters. This is why the file system is called FAT file system. Hereinafter, the cluster addresses are assumed as those obtained by simply dividing the LBA by N, where N=16 (one cluster=8 Kbytes).

FIG. 2B is a diagram showing an example of a FAT. The hybrid storage apparatus 4, for example, acquires the start cluster address (12340h) of File 1 from directory information A, refers to the FAT item, recognizing that the next data in File 1 is recorded in the cluster address 12341h. The apparatus 4 then acquires other cluster addresses, the last of which is EOF (end of fail). The apparatus 4 can thus read File 1. In this FAT file system, the FAT manages the files.

As shown in the right half of FIG. 2A, the storage area of the hybrid storage apparatus 4 is divided in the logical sector space Q, into four sub-areas, i.e., user area UA, system area SA, system area for hybrid storage, and cache area CA. Only the system area SA and the user area UA are allocated to the LBA space P as viewed from the host apparatus 2, as is illustrated in the left half of FIG. 2A. If the host apparatus 2 uses 5 Gbytes, i.e., cluster addresses 000000 to 9FFFFFh, it does not use any address following address 9FFFFFh.

In the system area SA, a master-boot record MBR, an initial program loader (IPL) and a FAT are stored. The IPL is a program that is executed to boot (activate) the system. The master-boot record MBR is a sector in which the LBA is 0 as viewed from the host apparatus 2. The master-boot record MBR contains a boot-strap code and a partition table.

The user area UA includes a directory area and a data area. The directory area is provided to record directory data for managing files. The data area is provided to record actual data. In the FAT file systems prior to the FAT32 version, the route directory is recorded in the system area SA. In the directory area, file name, extension, attribute, latest update time, start cluster address, file size, and the like are stored for each directory (file).

The system area for the hybrid storage apparatus is used by the CPU 20 of the hybrid storage apparatus 4 to store boot codes and various tables. Alternatively, it is used as an area for replacing secondary defects. Usually, the host apparatus 2 does not use the system area for the hybrid storage apparatus. Thus, it is omitted in FIG. 2A.

The cache area CA is used for temporarily string data. In this embodiment, the area CA is an area defined by logical sector numbers 000000h to 07FFFFh (256 Mbytes) in the logical sector space as viewed from the hybrid storage apparatus 4. Hence, the logical sector space differs from the LBA space as viewed from the host apparatus 2, in that the master-boot record MBR has a logical sector number of 08000h. A cluster address is defined for the disc cache area CA, too.

In the LBA space, the cache area CA is arranged in a space that follows cluster address F0000h (i.e., super-cluster address F000h) that the host apparatus does not use. This inhibits the host apparatus 2 from writing data directly into this disc cache area CA.

In recent years, zone-bit recording is generally performed in hard disc drives (HDDs), by applying the same write frequency and recording/reproducing parameters (e.g., the coefficient of a waveform-equivalent filter, and the like). The disc is divided into a plurality of zones (i.e., 10 to 20). In the zone-bit recording, the recording efficiency can be raised without necessity of changing the parameters if data is written in one zone only. Hence, the size for the disc cache area is determined from the size of the zone.

The logical sector space as viewed from the hybrid storage apparatus 4 in the embodiment of this invention will be explained in detail. In most HDDs to which the FAT file system is applied, data is continuously written as much as possible in the outer areas of the disc, at which the data-transfer speed is high. Once the outer circumferential areas are used up, data have to be written in the inner areas at which the data-transfer speed is low. As the data is repeatedly written and erased, it becomes increasingly difficult to secure continuous empty areas. Consequently, one file is recorded in many discontinuous clusters. This greatly reduces the data-transfer speed (generally, referred to as fragmentation).

This state makes a problem in the case where a large amount of data generated by a digital still camera continuously operated in the high-resolution mode has to be written in the disc at high speed.

To solve this problem, a cache area is provided in the outer circumferential area of the disc, where the data-transfer speed is high, the host apparatus may receive only the start cluster address from the HDD before it write data in the cache area, and the HDD may manage the FAT thereafter. Then, the HDD can efficiently use the outer circumferential area and can raise the data-transfer speed even if it is a low-performance one for public use.

The data-transfer speed decreases if the defective sectors are replaced by flawless ones in the cache area of the disc. In view of this, a replacement area may be provided adjacent to the cache area and defective sectors, if any, may not be replaced by flawless ones before data is written in the cache area. In this case, the slipping replacement method is carried out, thus replacing the defective sectors by flawless ones, after the data recorded in the cache area is transferred to the user area. Then, the replacement of sectors does not impair the access performance.

Even if the data-transfer speed is raised by this method, several seconds elapse before the data is transferred, when the HDD is activated anew or when the operating mode is switched from the power-saving mode to the ordinary mode. Further, since a time in units of 10 ms is necessary for the seek operation, the HDD is not able to start writing data or reading data at once. In order to increase the data-transfer speed still more, data is written in the cache area of the nonvolatile solid-state memory until the head is moved to a prescribed part (i.e., empty area) of the cache area of the disc 11. In other words, the data is written in the solid-state memory during the seek operation that is performed so that the head may write data. In this way, the data can be efficiently transferred during the standby periods.

As described above, the hybrid storage apparatus 4 of this embodiment has the nonvolatile solid-state memory 22 in addition to the disc 11. The memory 22 is used as a cache in the process of transferring data from the host apparatus 2 to the hybrid storage apparatus 4. The input/output performance of the nonvolatile solid-state memory 22 does not change, whether it is accessed at random or in sequence. By contrast, the data-writing/reading performance of the disc 11 decreases when the disc 11 is accessed at random. Further, the sequential data-writing to the nonvolatile solid-state memory 22 is slower than the sequential data-writing to the disc. In consideration of this characteristic difference between the memory 22 and the disc 11, the addresses of the memory 22 are arranged before the cache area, before the system area, and after the user area. That is, in the present embodiment, the nonvolatile solid-state memory 22 is addressed in the logical sector space, as is illustrated in FIG. 3.

Figure 3:
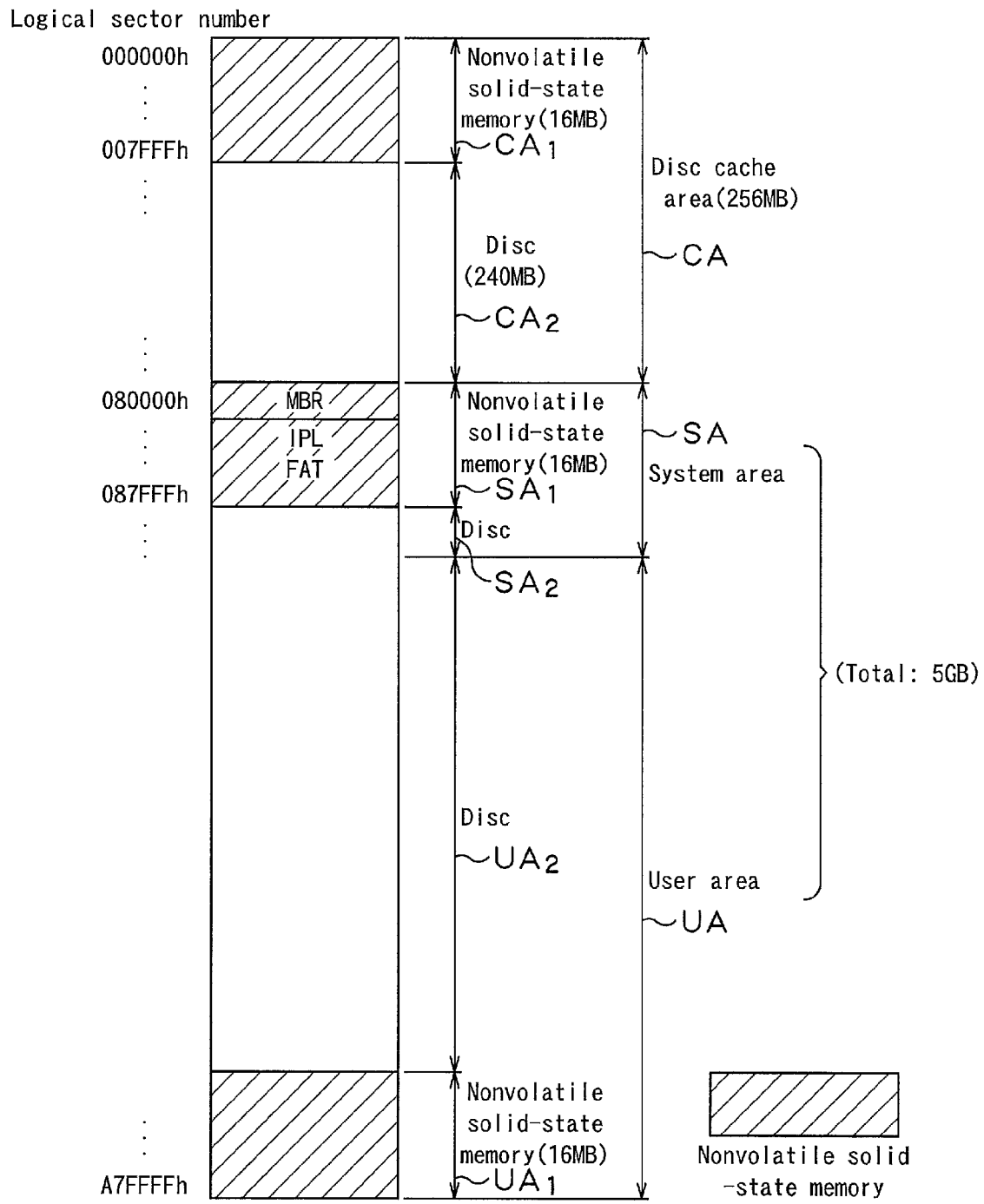
FIG. 3 is a schematic representation of the addressing in the logical-sector space of the nonvolatile solid-state memory incorporated in the embodiment of the invention.

Assume that in the logical sector space Q of FIG. 3, the 16-Mbyte area $CA_1$ constituted by logical sectors 000000h to 007FFFh or, i.e., one part of the 256-Mbyte cache area CA constituted by logical sectors 000000h to 07FFFFh, is allocated to the nonvolatile solid-state memory 22, and the 240-Mbyte area $CA_2$ constituted by logical sectors 007FFFh to 07FFFh, i.e., the other part of the cache area CA, is allocated to the disc 11. Although the system area and the user area amount, in total, to 5 Gbytes, the first 16-Mbyte area on the system area, which is constituted by 080000h to 087FFh, and the last 16-Mbyte of the user area are allocated to the nonvolatile solid-state memory 22. Consecutive logical sector numbers are thus assigned to the disc 11 and the nonvolatile solid-state memory 22. Therefore, the data to be written in or read from the disc 11 and the nonvolatile solid-state memory 22 can be managed in the same way as data recorded in, for example, one disc.

Hence, the cache area $CA_2$ provided on the disc 11 makes it possible to write a large amount of data stably and at the maximum data-transfer speed that the hybrid storage apparatus 4 has. The cache area $CA_2$ should therefore be provided in the outermost circumferential area of the disc 11. If the cache area $CA_2$ includes any defective physical sector, a replacement area having sector that may replace the defective sector may be provided adjacent to the cache area $CA_2$.

The outer circumferential area of the disc 11, in which data can be transferred at high speed, is used as cache area $CA_2$. The data-transfer speed as viewed from the host apparatus 2 can therefore be greatly increased. That is, the data transferred from the host apparatus 2 is written in the cache areas $CA_1$ and $CA_2$, and the data is transferred from the cache area $CA_1$ of the nonvolatile solid-state memory 22 and the cache area $CA_2$ of the disc 11 to the user area $UA_1$ of the nonvolatile solid-state memory 22 and the user area $UA_2$ of the disc 11, at which the data-transfer speed is lower than at the cache area $CA_2$ of the disc 11. The cache areas $CA_1$ and $CA_2$, at which data can be transferred at high speed, are thereby released and prepared for the subsequent writing of data. Thus, the hybrid storage apparatus 4 can write a great amount of data at high speed.

If a great amount of data is transferred from the host apparatus 2, the data is written in the cache areas $CA_1$ of the nonvolatile solid-state memory 22 until the cache area $CA_2$ of the disc 11 is prepared to store data. Further, data is written in parallel in both the cache area $CA_1$ and the cache area $CA_2$, as will be described later. Then, the data can be written at high speed. If data is transferred from the host apparatus 2 in not so large an amount or if data does not have to be written at so high a speed, only the cache area $CA_2$ of the disc 11 may be utilized.

Of the data to be recorded in the system areas $SA_1$ and $SA_2$, the data items, such as MBR, IPL and FAT, which should be read frequently, are stored in the nonvolatile solid-state memory 22 that can be accessed at high speed. The data can therefore be read at high speed.

Similarly, of the data to be written in the user areas $UA_1$ and $UA_2$, only the head data, such as the head cluster of a file or super cluster, may be stored in the user areas $UA_1$ provided in the nonvolatile solid-state memory 22. In this case, in the hybrid storage apparatus 4, when the data is read out in units of files or supper clusters while the head data is read from the nonvolatile solid-state memory 22, the head can be moved or the disc can undergo idling rotation while the head data is being read from the nonvolatile solid-state memory 22. This helps to raise the data-reading speed.

How the hybrid storage apparatus 4 operates to write data by using the cache area $CA_1$ and the cache area $CA_2$ will be described in detail, with reference to FIG. 1 to FIG. 5. Usually, the host apparatus 2 controls the address data for managing the files recorded in the disc 11. (The operating mode in which the apparatus 2 so operates is known as PC mode.) The present embodiment has an operating mode in which the hybrid storage apparatus 4 can process the FAT and manage the FAT if it is permitted by the host apparatus 2. This specific mode will be referred to as AV mode. In the AV mode, the hybrid storage apparatus 4 can process the FAT and manage the same. More precisely, the apparatus 4 reads the data of the FAT area recorded in the system area SA (i.e., an area provided in the nonvolatile solid-state memory 22 in this embodiment), into the memory 19 (FIG. 1) incorporated in the hybrid storage apparatus 4 and updates this data in the memory 19. If necessary, the apparatus 4 performs management, thus updating the FAT in the system area SA. When set to the PC mode, the apparatus 4 writes the FAT updated in the memory 19, back into the FAT area included in the system area SA. Thus, the hybrid storage apparatus 4 exclusively manages not only the host apparatus 2, but also the FAT.

To control the address information that manages the files, it is necessary to manage the FAT and the directory information, both recorded in the system area SA. The FAT is exclusively shared by the host apparatus 2 and the hybrid storage apparatus 4 when the host apparatus 2 switches the operating mode between the PC mode and the AV mode. The directory information is not managed by the hybrid storage apparatus 4. The host apparatus 2 sets a command dedicated to the directory information, and can therefore directly access the system area SA to manage the directory information, no matter whether the host apparatus 2 operates in the PC mode or the AV mode.

In the present embodiment, data is written by using the cache area CA while the hybrid storage apparatus 4 is operating in the AV mode, controlling the address information that manages the files. As pointed out above, the host apparatus 2 and the hybrid storage apparatus 4 shares the FAT information in the recording/reproducing system 1. Nevertheless, the hybrid storage apparatus 4 is assigned to the FAT and the management thereof. Hence, the operating mode is switched to the AV mode to write data. To switch the operating mode to the AV mode, the FAT existing in the system area SA of the hybrid storage apparatus 4, i.e., the FAT area FA shown in FIG. 2A, is updated to the latest one. Thereafter, a command is issued to the hybrid storage apparatus 4, thereby switching the hybrid storage apparatus 4 from the PC mode to the AV mode (Step S1). The CPU 20 incorporated in the hybrid storage apparatus 4 determines the content of the command via the interface control unit 18, reads the FAT in the system area SA, and develops the FAT in the memory 19 (Step S2). Then, the CPU 20 sets a flag indicating the AV mode and informs the host apparatus 2 that the apparatus 4 has been switched to the AV mode (Step S3).

After the apparatus 4 has been switched to the AV mode, the host apparatus 2 may write data as will be explained below. Assume that a digital camera is continuously operated and that the host apparatus 2 requests for the content data generated by the digital camera. In this case, the host apparatus 2 determines the file name (File 1, File 2) of the content data and generates new directory item. The new directory item is written into the hybrid storage apparatus 4 (Step S4). Note that this directory item is incomplete because neither the start cluster address nor the latest updated time is unknown. The hybrid storage apparatus 4 retrieves empty clusters from the FAT it has, selects appropriate clusters from the empty clusters retrieved, and write data into the clusters selected. Then, the hybrid storage apparatus 4 informs the host apparatus 2 of the start cluster address represented by the directory information A shown in FIG. 2A.

Next, the host apparatus 2 sets parameters that are necessary to write the content data. More specifically, the host apparatus 2 determines a size for the start cluster address of a file and an access size for the file. The host apparatus 2 has assigned the management of the cluster address to the hybrid storage apparatus 4. However, it is necessary to share at least the start cluster address in order to identify the file. FIGS. 5A and 5B show an example of a command (Set Write File Parameter). To be more specific, FIG. 5A illustrates the content that a register has when a command is issued. FIG. 5B illustrates the content that the register has when the command is completely executed. The command is defined as an AT vender-unique command. It is executed only once before data is written into the file. The hybrid storage apparatus 4, which has executed the command, informs the host apparatus 2 of the cluster address at which the writing of data is initiated.

To use the cache area CA, the hybrid storage apparatus 4 is informed that the cache area CA can be used for files. That is, the command shown in FIG. 5A sets 1 to the cache position (CP) bit (Steps S6 and S7). At this time, the hybrid storage apparatus 4 retrieves empty clusters from the head part of the user area UA provided in the FAT that is stored in the memory 19. Any cluster address retrieved is notified, as record-start cluster address, to the host apparatus 2. For File 1 shown in FIG. 2A, the record-start cluster address is 12340h.

At the same time, the apparatus 4 retrieves empty clusters from the cache area CA. The apparatus 4 records the address of any empty cluster selected, as head cluster address (i.e., super cluster address), along with the record-start cluster address recorded in the user area UA, which has been notified to the host apparatus 2.

In FIG. 3, the record-start address of File 1 is F00000h in the LBA and has logical sector number of 000000h, cluster address (cluster number) of F00000h, and super-cluster address (super cluster number) of F000h. Similarly, the record-start address of File 2 is F00500h in the LBA and has logical sector number of 000500h, cluster address of F0050h, and super-cluster address of F005h. That is, the head clusters of File 1 and File 2 are recorded in the disc cache area $CA_1$ of the nonvolatile solid-state memory 22.

The data transferred from the host apparatus 2 is stored into the buffer memory 17 shown in FIG. 1. The data is then written in the empty clusters provided in the cache area $CA_1$ of the nonvolatile solid-state memory 22, in units of access sizes, or in units of super clusters in the present embodiment. At this time, the head is started moving towards the writing position on the cache area $CA_2$ of the disc 11. Until the head reaches a desired writing position, data is continuously written into the nonvolatile solid-state memory 22.

When the head reaches the desired writing position, the writing data into the cache area $CA_2$ is started. The hybrid-storage apparatus control unit 16 formats the data recorded in the buffer memory 17 and supplies this data to the read/write channel unit 15. The data is written in the disc 11, in units of super clusters, i.e., the access size adopted in the present embodiment.

It is determined whether the super cluster written is the last cluster (EOF, or end of file) of the file (Step S8). The data-writing is continued to the very last cluster. If the super cluster is not the last cluster, the FAT in the memory 19 is updated in units of access, or every time one cluster is written, by utilizing the cluster address in the cache area CA that is mapped in the LAB space (Step S9). The process then returns to Step S8. At this time, the data is compressed if the CPU 20 of the hybrid storage apparatus 4 or the hybrid-storage apparatus control unit 16 is able to do so. The amount of data to be written into the cache area $CA_2$ provided on the disc 11 can therefore be reduced, thereby to increase the data-transfer speed as viewed from the host apparatus 2. On the other hand, the host apparatus 2 updates the directory item recorded in the system area SA, for the latest update time and the start cluster address. Thereafter, the host apparatus orders the hybrid storage apparatus 4 to write the FAT from the memory 19 into the disc 11 (Step S10). The data-writing in the disc cache area CA is thereby completed.

Figure 6:
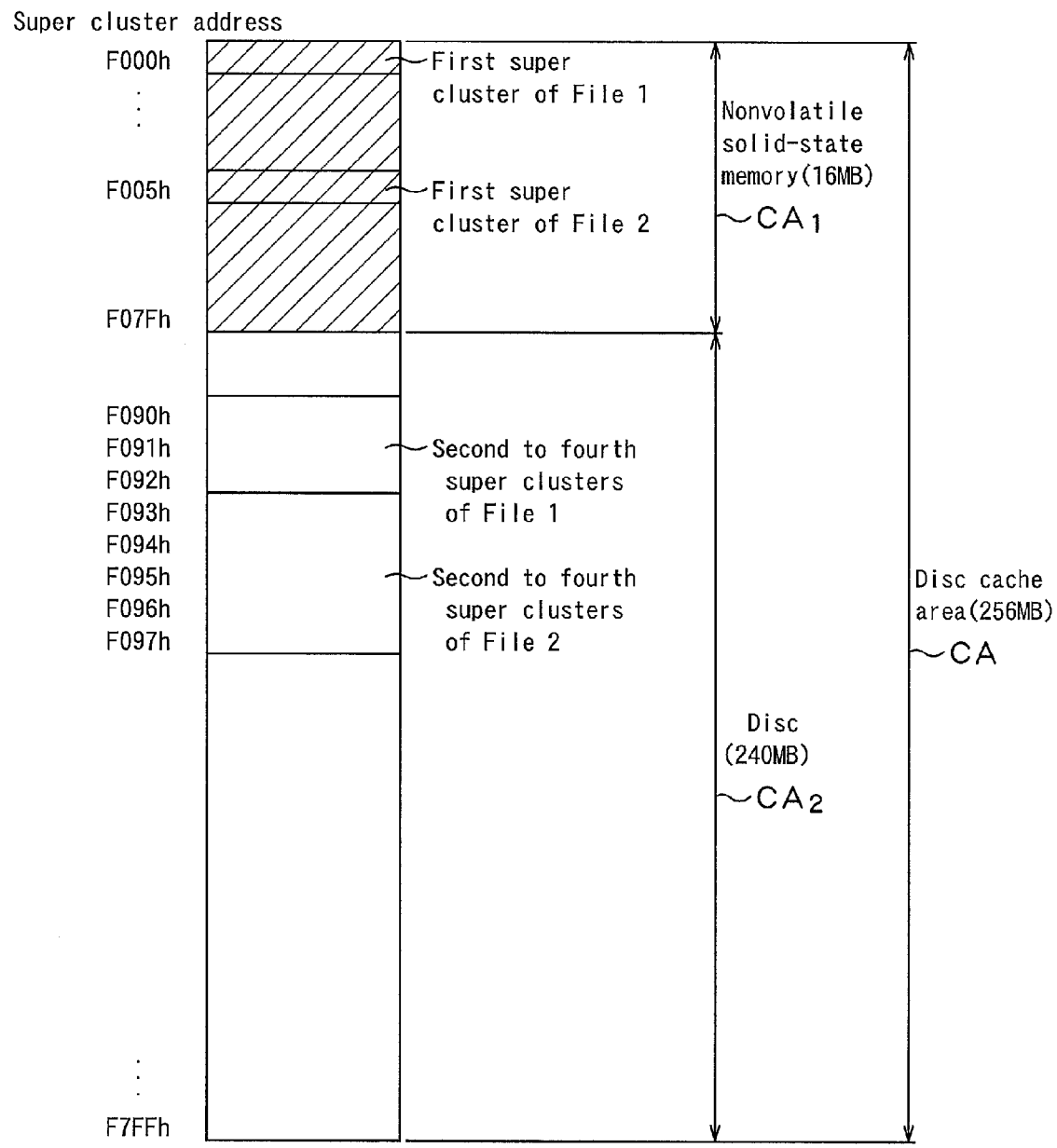
FIG. 6 is a schematic representation of an example of a disc cache area CA into which data has been written.

FIG. 6 is a schematic representation of an example of a disc cache area CA into which data has been written. FIG. 6 pertains to the case where the head reaches a prescribed position in the cache area $CA_2$ of the disc 11 while one super cluster is being written in the cache area $CA_1$ of the nonvolatile solid-state memory 22. More precisely, the head has already reached the writing position in the cache area $CA_2$ of the disc 11, while the first cluster of File 1 is being written at the super cluster address (super cluster number) F000h in the cache area $CA_1$ of the nonvolatile memory 22. The head writes the second to fourth super clusters of File 1, at the super cluster addresses F090h, . . . , F092h in the cache area $CA_2$. The head finishes moving, while the first super cluster of File 2 is being written in the cache area $CA_1$. The head then writes the second to sixth super clusters of File 2, at the super cluster addresses F093h, . . . F097h in the cache area $CA_2$. When several super clusters are written into the nonvolatile solid-state memory 22, the speed with which they are written remains unchanged, even if the memory 22 is accessed at random. Hence, a plurality of super clusters does not have to be written continuously.

At this time, no data has been written into the record-start cluster address provided in the user area. Nevertheless, a flag is set in the FAT, indicating that the record-start cluster address has been used.

Thereafter, it is determined whether the switching of the operating mode, from the AV mode to the PC mode, has been requested, and whether a predetermined time has elapsed (Steps S11 and S12). If the host apparatus 2 has ordered that a FLUSH operation be performed or the operating mode be changed, or if no data has been written or read in the predetermined time, the data in the cache area CA is copied to an ordinary area, such as the area C included in the user area UA shown in FIG. 2 (Step S13). Since the host apparatus 2 has already been informed of the start cluster address, the data-recording is started at the start cluster address that has been notified to the host apparatus 2. Then, the FAT stored in the memory 19 is referred to, searching the user area UA for empty clusters, from the head of this area UA. As soon as empty clusters are found, the data is written into them. In the case of FIG. 2, cluster address 12340h is the record-start address and File 1 is recorded at addresses 12341h to 1237Fh. If the data has been compressed, it is expanded to the initial state and then written.

Upon completion of copying, the FAT in the FAT area FA included in the system area SA is subjected to final updating (Step S14). If necessary, the operating mode is switched from the AV mode to the PC mode (Step S15). During the copying, the host apparatus may instruct that the mode be switched from the AV mode to the PC mode. In this case, the host apparatus 2 is informed that the process has not been completed and interrupts the switching of mode.

In the present embodiment, the host apparatus 2 receives only the start cluster address from the hybrid storage apparatus 4, in order to write data. Thereafter, the management of the FAT is performed in the hybrid storage apparatus 4. The outer circumferential area (i.e., cache area $CA_2$) can therefore be efficiently used. In addition, the nonvolatile solid-state memory 22 can be used as a cache before the cache area $CA_2$ becomes prepared for recording data. A large file can therefore be continuously written at an extremely high efficiency. The host apparatus 2 does not have to have a large buffer. Thus, the data-transfer speed can be increased, which shortens the time during which the data generated by, for example, a digital camera remains not recorded.

A method of transferring data will be explained with reference to FIGS. 6 to 8. This method can be employed if the speed of transferring data to the buffer memory 17 is sufficiently high, data can be written into the nonvolatile solid-state memory 22 and the disc 11 at the same time and the speed of writing data into the nonvolatile solid-state memory 22 is relatively high.

Figure 7:
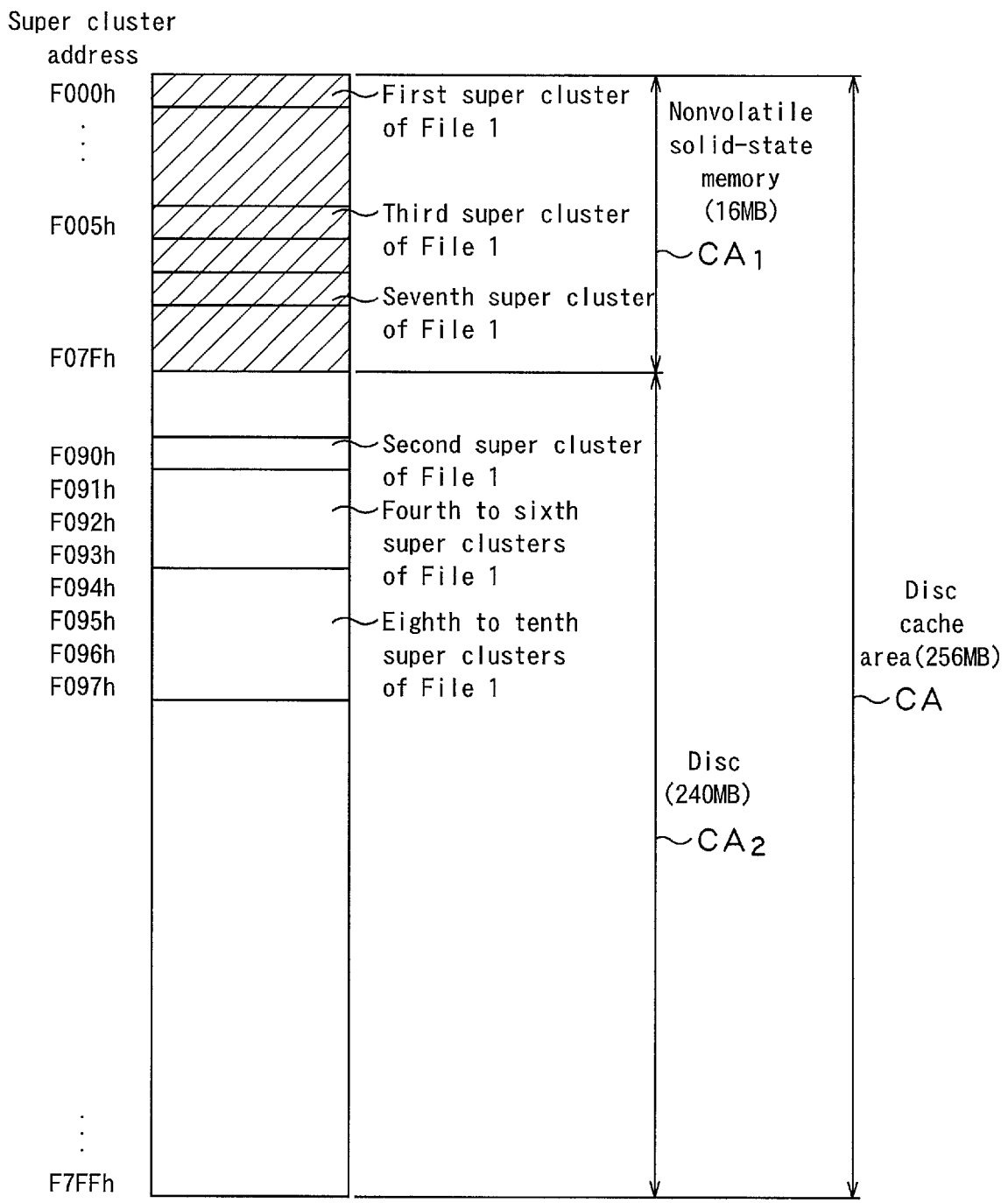
FIG. 7 is a diagram depicting how 10 super clusters written in the cache area CA are arranged in File 1.
Figure 8:
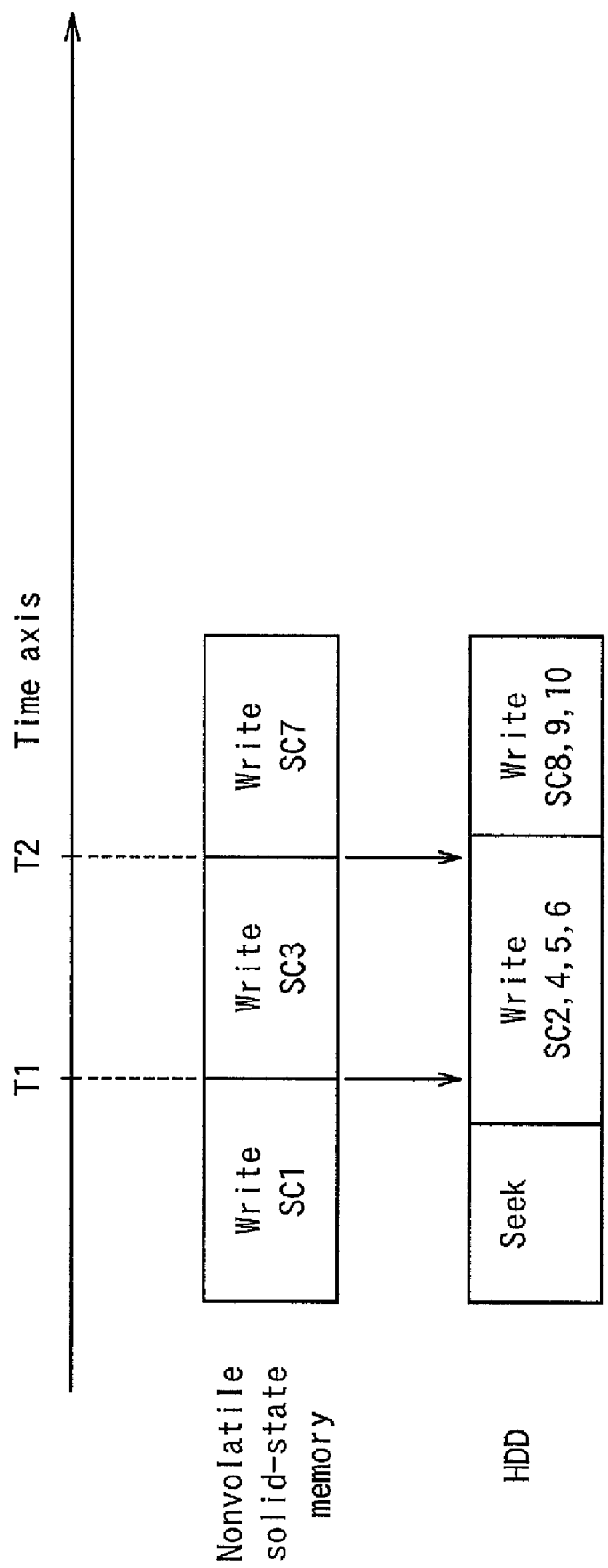
FIG. 8 is a timing chart illustrating the timing of writing File 1 including 10 super clusters in the cache area CA.

FIGS. 7 and 8 are diagrams depicting how the ten super clusters constituting File 1 are arranged in the cache area CA and illustrating the timing of writing File 1 in the cache area CA. First, the head is moved to the cache area $CA_2$ provided on the disc 11 while the first super cluster is being written into the cache area $CA_1$ of the nonvolatile solid-state memory 22. Then, the second super cluster is written in the cache area $CA_2$. The time (program time) necessary to write the second super cluster into the nonvolatile solid-state memory 22 is not constant. If the data-writing speed is lowest (hereinafter referred to as lowest speed), data is written into the nonvolatile solid-state memory 22 more slowly than into the disc 11. In the case shown in FIG. 8, the ratio of the speed of writing data into the cache area $CA_1$ of the nonvolatile solid-state memory 22 to the speed of writing data into the cache area $CA_2$ of the disc 11 is 1:3, for the sake of simplicity. In practice, however, the speed of writing data into the nonvolatile solid-state memory 22 varies, depending on the size of the data to be written, the characteristics of the individual device, the location at which the data is written, the operating temperature, the number of times the writing is repeated, and the like. The speed of writing data into the disc 11 varies, too, depending on whether the data is written in an inner or outer circumferential area, the characteristics of the individual device, the continuity of empty areas, and the like.

FIG. 7 shows the case where the head has moved to the disc 11 and is writing the second super cluster when the data-writing to the nonvolatile solid-state memory 22 ends, that is, when the first super cluster is written completely. In this case, when the first super cluster is completely written into the cache area $CA_1$ of the nonvolatile solid-state memory 22, the third super cluster is selected, which is next to the super cluster (i.e., second super cluster) being written into the cache area $CA_2$ of the disc 11. The third super cluster is then written into the cache area $CA_1$.

Thus, the second super cluster SC2 is written into the cache area $CA_2$ of the disc 11 at time T1 when the first super cluster SC1 is completely written in the cache area $CA_1$ of the nonvolatile solid-state memory 22 as shown in FIG. 8. Hence, the writing of the third super cluster SC3 is started at the cache area $CA_1$ of the nonvolatile solid-state memory 22, and the fourth to sixth super clusters SC4 to SC6 are written into the cache area $CA_2$ of the disc 11 while the third super cluster SC3 is being written into the cache area $CA_1$ of the nonvolatile solid-state memory 22.

At time T2 when the third super cluster SC3 is completely written into the cache area $CA_1$ of the nonvolatile solid-state memory 22, the seventh super cluster SC7, i.e., the cluster next to the sixth super cluster SC6 being written into the cache area $CA_2$ of the disc 11, is selected. The seventh super cluster SC7 thus selected is written into the cache area $CA_1$ of the nonvolatile solid-state memory 22. While the seventh super cluster SC7 is being so written, the eighth to tenth super clusters SC8 to SC10 are written into the cache area $CA_2$ of the disc 11. Thus, the ten super clusters are all written.

If such parallel data-writing is possible, the head-seek time and the disc-rotation standby time can be effectively utilized, though data is written into the cache area $CA_1$ of the nonvolatile solid-state memory 22 until the cache area $CA_2$ of the disc 11 is prepared to record data, that is, until the disc 11 is accessed after the data has been transferred from the host apparatus 2. Once the head reaches the predetermined writing position, the data is written at a speed that is the sum of the speed of writing data to the disc 11 and the speed of writing data to the nonvolatile solid-state memory 22. Thus, the data writing speed is improved.

Figure 9:
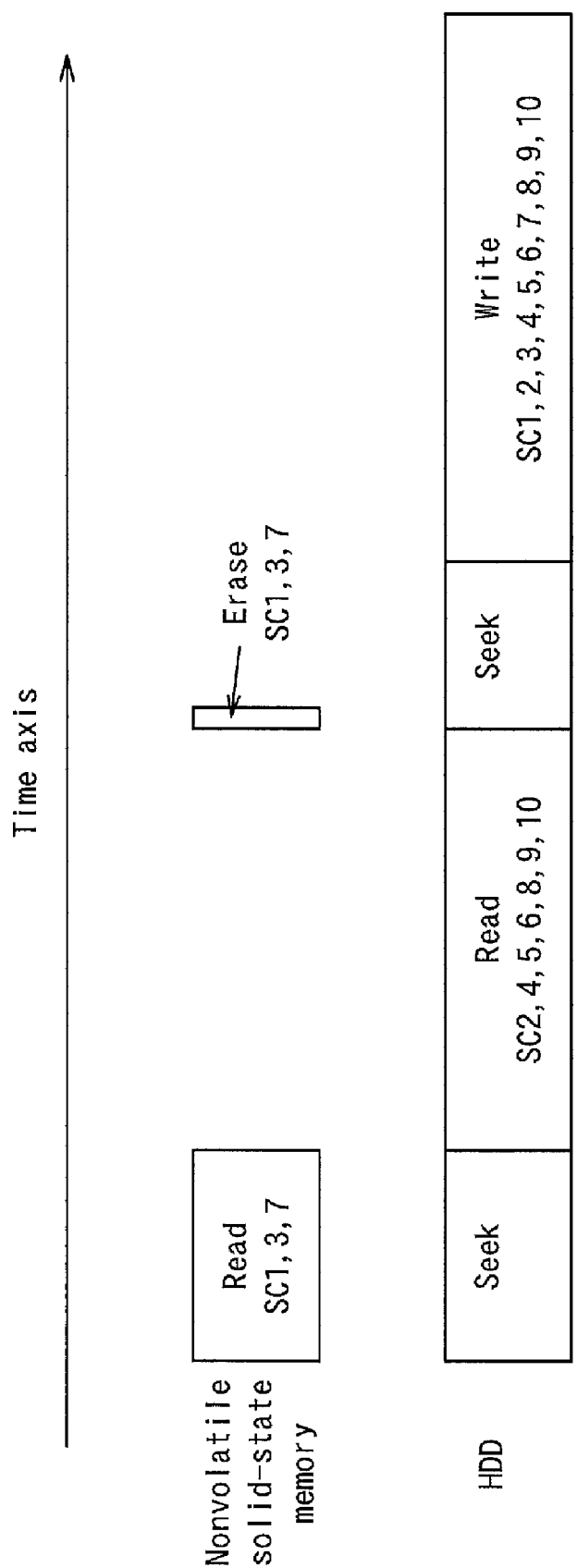
FIG. 9 is a timing chart illustrating the timing of a FLUSH operation.

FIG. 9 is a chart illustrating the timing of a FLUSH operation. As described above, the data written in the cache area CA is moved into the user area UA if neither data-writing nor data-reading is performed for a preset time when the host apparatus 2 orders that a FLUSH operation be performed or the operating mode be changed (namely, at the time of an IDLE operation).

To perform an FLUSH operation, data is read out at the same time from both the cache area $CA_1$ of the nonvolatile solid-state memory 22 and the cache area $CA_2$ of the disc 11. The data thus read is then copied in the user area UA. In the meantime, the data is erased from the nonvolatile solid-state memory 22. That is, the head is moved to read data from the cache area $CA_2$ of the disc 11 while the first, third and seventh super clusters are being read from the cache area $CA_1$ of the nonvolatile solid-state memory 22. At the time the head has been moved completely, the second super cluster, the fourth to sixth super clusters and the eighth to tenth super clusters are read from the cache area $CA_2$ of the disc 11. While the head is being moved to a prescribed empty cluster position in the user area UA, data is erased from the disc cache area $CA_1$ of the nonvolatile solid-state memory 22. The ten super clusters are then sequentially written into the user area of the disc 11.

Figure 4:
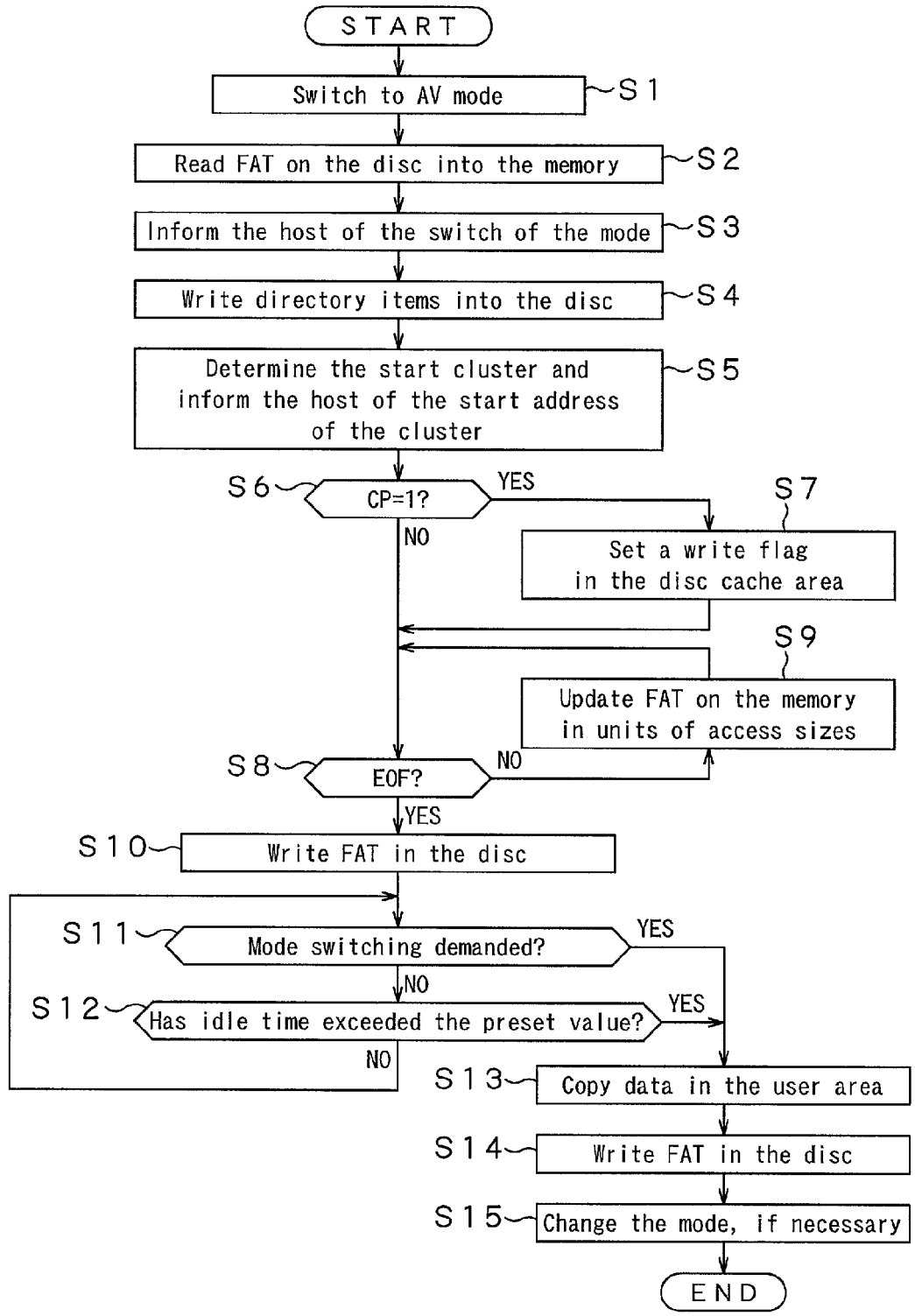
FIG. 4 is a flowchart showing a method of operating the hybrid storage apparatus used in the embodiment of the invention, in order to write data by using a cache area CA.

To transfer the data into the user area UA, the first super cluster SC1 of File 1, for example, is written into the user area $UA_1$ provided in the nonvolatile solid-state memory 22 shown in FIG. 4. The following super clusters SC2 to SC10 are written into the user area $UA_2$ provided on the disc 11. Then, to read the data of File 1, the head can be moved to the position where the second super cluster SC2 is recorded in the user area $UA_2$ of the disc 11 while the first super cluster SC1 is being read from the user area $UA_1$ of the nonvolatile solid-state memory 22. The data-reading speed can therefore be raised in the data-reading process, too.

Figure 10A:
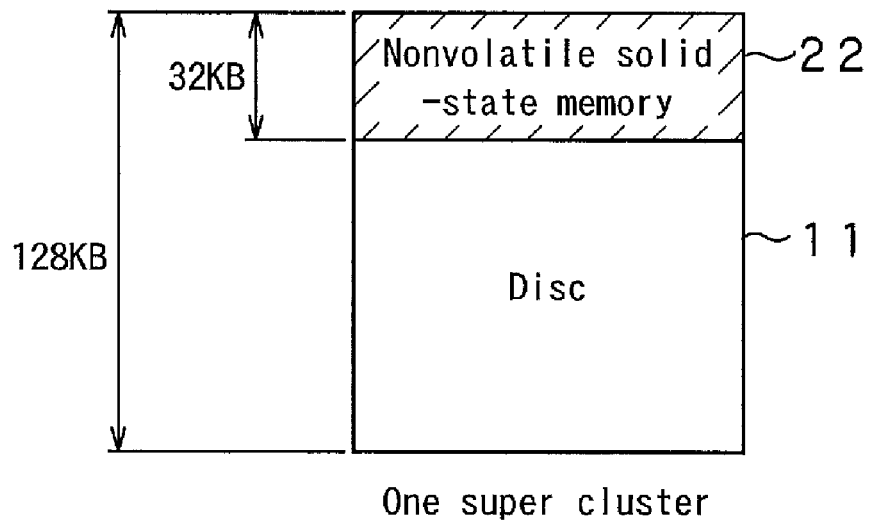
FIG. 10A is a diagram showing a ratio of a part of a super cluster, which is recorded in a nonvolatile solid-state memory to the remaining part of the super cluster, which is recorded in a disc.
Figure 10B:
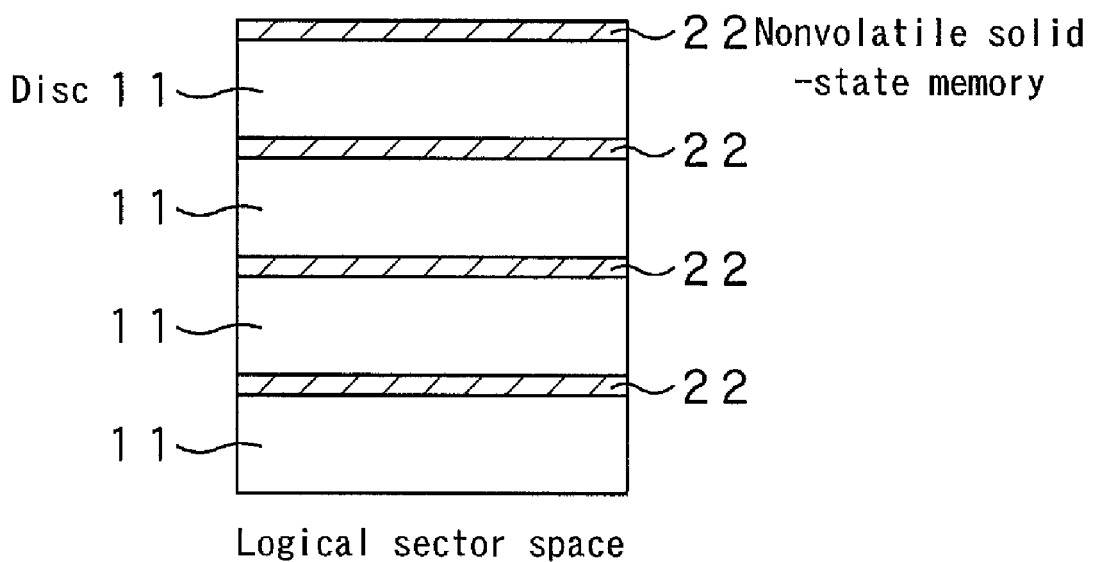
FIG. 10B is a diagram showing a logical-sector space.

A method of transferring data will be explained, which can be employed if the speed of writing data into the nonvolatile solid-state memory 22 is comparatively low. In this case, one super cluster is divided into parts, some of which are recorded in the cache area $CA_1$ of the nonvolatile solid-state memory 22 and the others of which are recorded in the cache area $CA_2$ of the disc 11. FIG. 10A is a diagram showing the part of one super cluster, which is written in the nonvolatile solid-state memory 22, to the other part of the super cluster, which is written in disc 11. FIG. 10B is a diagram showing a logical-sector space.

FIG. 10A shows the head part of a super cluster. Of the head part, one quarter (¼), i.e., 32-KB data, is written in the cache area $CA_1$ of the nonvolatile solid-state memory 22, and the remaining three quarters (¾), i.e., 96-KB data, is recorded in the cache area $CA_2$ of the disc 11. Unlike in the case of FIG. 4, the nonvolatile solid-state memory 22 is divided into several segments in the logical sector space Q as is illustrated in FIG. 10B. How large a part of the super cluster should be allocated to the nonvolatile solid-state memory 22 can be determined by the standard data-transfer speed and the data-transfer speed of the hybrid storage apparatus 4.

In this case, too, the cache areas CA of the nonvolatile solid-state memory 22 and disc 11 can be simultaneously accessed and the data can be erased from the nonvolatile solid-state memory 22 while the data is transferred to the user area UA, in order to perform a FLUSH operation. To write data into the user area UA, too, some clusters arranged at the head of the super cluster are transferred to the user area $UA_1$ provided in the nonvolatile solid-state memory 22, and the subsequent data is transferred to the user area $UA_2$ provided on the disc 11. The data can therefore read at a higher speed than otherwise.

In this embodiment, the data transferred from the hose apparatus 2 is temporarily written in the cache area CA. More specifically, the data in the first super cluster or in the head part of each super cluster is written into the cache area $CA_1$ of the nonvolatile solid-state memory 22 until the disc 11 is prepared to record data, utilizing the seeking time and the disc-rotation standby time. The overhead inevitably accompanying the seek operation can be thereby reduced. In addition, after the seek operation of the disc 11, the data-transfer speed in the data-writing process can be further raised if data is written, in parallel, into the cache area $CA_1$ of the nonvolatile solid-state memory 22 and the cache area $CA_2$ of the disc 11.

In a nonvolatile solid-state memory such as an NAND flash memory, data has to be erased before new data is written. Nonetheless, data does not have to be erased from the cache area $CA_1$ of the nonvolatile solid-state memory 22 before data is written into the cache area $CA_1$, in order to transfer data from the cache region CA to the user area UA.

To transfer data from the cache area CA to the user area UA, the first super cluster of a file or the head parts of the super clusters are transferred to the nonvolatile solid-state memory 22 and the remaining data is transferred to the disc 11. Hence, the seeking time and the disc-rotation standby time can be effectively utilized in the data-reading process, too, until the disc 11 is prepared to read data. To write data into the user area UA, too, the data may be written, in parallel, into the user area $UA_1$ of the nonvolatile solid-state memory 22 and the user area $UA_2$ of the disc 11. Then, the data can be transferred to the user area faster than otherwise.

The advantages of this embodiment will be explained in detail. A NAND flash memory writes and reads data (or is programmed) in units of pages. In it, data is erased in units of blocks. Originally, each block was originally 16 Kbytes and each page was 528 bytes (512 bytes for data area and 16 bytes for an error-correcting code; actual data size being 0.5 Kbytes). In recent years, some of the memories used write and read data in units of 128-KBbyte blocks and in units of 2112-byte pages (512 bytes (data area)+16 bytes (error-correcting code)×4; actual data size being 2 Kbytes). In view of this, blocks and pages of the new type are called large blocks large pages, while blocks and pages of the old type are called small blocks and small pages. Note that the blocks and pages of the new type are not able to be used together with those of the old type. For example, large blocks are not able to be used together with small pages.

FIGS. 11A and 11B are diagrams explaining the operating time of an NAND flash memory used as the nonvolatile solid-state memory. More specifically, FIG. 11A shows two different blocks in the NAND flash memory and the page-size parameters stored in the flash memory, and FIG. 11B shows the data-transfer speeds calculated from the parameters shown in FIG. 11A. As seen from FIG. 11B, the memory operates faster for large blocks than for small blocks. This is because the large block is a larger accessed unit than the small block.

The average erasure time of large blocks is 2000 μs, and that of the small blocks is 2000 μs, too. The erasure time under the worst condition (i.e., longest delay time) is 4000 μs for the large blocks and 1000 μs for the small blocks. For large blocks, the programming time for one page and the time for transferring one-page data between the memory cells and a register are, in average, 305.9 μs and 130.9 μs, respectively, and the maximum delay time for one page and the maximum delay time for transferring one page are 805.9 μs and 130.9 μs, respectively. For small blocks, the programming time for one page and the time for transferring one-page data between the memory cells and a register are, in average, 226.7 μs and 51.7 μs, respectively, and the maximum delay time for one page and the maximum delay time for transferring one page are 1026.7 μs and 51.7 μs, respectively.

If such a NAND flash memory is used, the operating time is 7.26 ms (rounded off at the third decimal point) when 16 Kbytes is written (for small pages) as shown in FIG. 11B. In a hard disc having 200 sectors for each track and rotated at the speed of 3600 rpm, it takes 2.67 ms (rounded off at the third decimal point) to write 16 Kbytes.

In the case of FIG. 9, 58.1 ms is necessary, in average, to write one 128-Kbyte super cluster into the NAND flash memory (for small pages). Using this time, three super clusters can be written into the hard disc (for a period of 64 ms).

When the data-transfer speed is the lowest, it takes 263 ms to write one 128-KByte super cluster into the NAND flash memory (for small pages). Thus, 13 super clusters can be written into the hard disc (for a period of 278 ms). At the time the data is completely written into the NAND flash memory, the super cluster being written into the hard disc may be identified and the next super cluster may be written into the NAND flash memory. In this case, the overall data-transfer speed is almost equal to the sum of the rotation speed of the hard disc and the speed of transferring data to the NAND flash memory.

Assume that, as shown in FIGS. 10A and 10B, 32 Kbytes and 96 Kbytes included in one super cluster are written in the form of a small page in the NAND flash memory and the hard disc respectively. Then, the average data-writing time is:

$$2 \times 7.26 \text{ ms} = 14.52 \text{ ms} < 16 \text{ ms} = 6 \times 2.67 \text{ ms}.$$

Hence, almost perfect parallel data-writing can be achieved.

When data is accessed in units of super clusters, the first super cluster can be output, virtually without delays, if the heat part of the super cluster is written into the nonvolatile solid-state memory 22. In the meantime, the hybrid storage apparatus 4 performs the head-seek operation. The head is moved to the position where the remaining data (super cluster) is recorded. The head reads the remaining data and transfers it to the host apparatus 2. Thus, the seek-operation time that has hitherto been wasted can be effectively utilized to read data. The data-reading speed can be increased, too.

If the speed of writing data into the nonvolatile solid-state memory is low, the ratio of data to be written into the nonvolatile solid-state memory 22 is decreased. For example, the size of the super cluster may be increased from 128 KBytes to 256 KBbytes and the data to be stored into the nonvolatile solid-state memory is reduced from 32 KBytes to 16 KBytes. In this case:

$$32.9 \text{ ms} < 40 \text{ ms} = 15 \times 2.67 \text{ ms}.$$

As a result, equally efficient parallel data-writing can be accomplished, though the data-transfer speed decreases a little.

Figure 12:
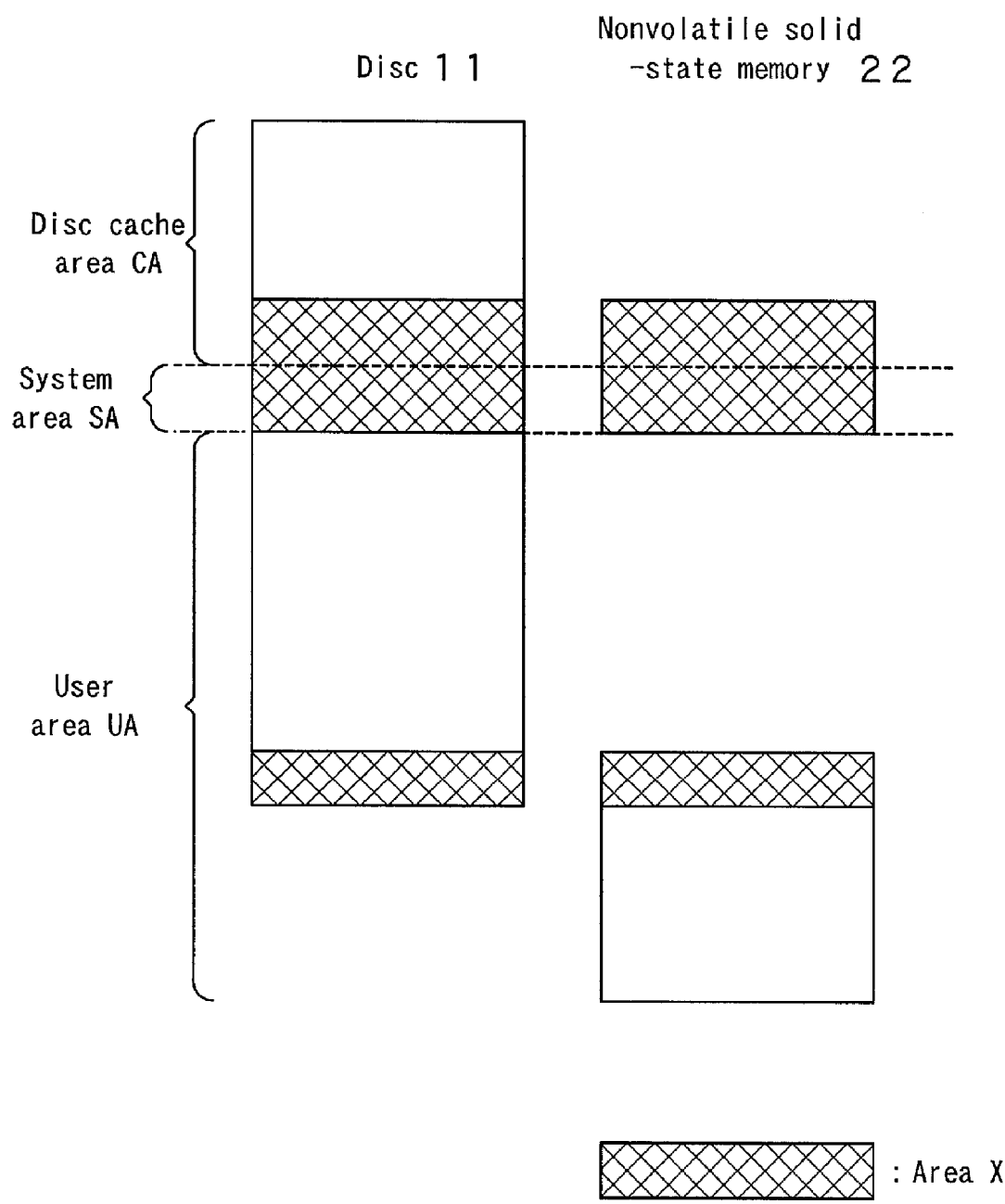
FIG. 12 is a diagram showing an area X that overlaps partly an area of the disc 11 and partly an area of the nonvolatile solid-state memory 22.

As indicated above, the host apparatus 2 accesses the hybrid storage apparatus 4 by using the logical block address (LBA), not the logical sector number (LSN). Both the disc 11 and the nonvolatile solid-state memory 22 may have areas each recording the LBA as illustrated in the conceptual diagram of FIG. 12. In FIG. 12, the areas X are provided in the disc cache area CA, the system area SA and the user area UA. Instead, the areas X may be provided in one or two of these three areas.

The hybrid-storage apparatus control unit 16 performs the process of recording, in the areas X, the data transferred from the host in accordance with a command (FIG. 13) that instructs the recording of the data transferred from the host apparatus. The hybrid-storage-apparatus control unit 16 determines whether the data should be written in the areas X or any other areas, from the MP of the command (Set Write File Parameter). For example, the MP for the areas X provided on the disc 11 is "0" and the MP for the areas X provided in the nonvolatile solid-state memory 22 is "1."

In the hybrid storage apparatus 1 according to the embodiment of the present invention, the FAT and the like are recorded in both the disc 11 and the nonvolatile solid-state memory 22 if the system area SA, for example, has areas X, and important data items are recorded in both the disc 11 and the nonvolatile solid-state memory 22 if the user area UA has areas X. Hence, a firm and secure system can be constructed.

It should be understood by those skilled in the art that various modifications, combinations, sub-combinations and alterations may occur depending on design requirements and other factors insofar as they are within the scope of the appended claims or the equivalents thereof.

What is claimed is:

1. A hybrid data-storage apparatus comprising:
   a recording medium having a cache area for temporarily storing data transferred from a host apparatus;
   a nonvolatile solid-state memory having a cache area for temporarily storing the data transferred from the host apparatus; and
   control means for controlling writing of the data transferred from the host apparatus, temporarily into the cache areas of the recording medium and the nonvolatile solid-state memory,
   wherein,
   the cache areas include a first write area composed of first and second storage areas for temporarily storing the data transferred from the host apparatus, a second write area having a third storage area to which data is transferred more slowly than to the first write area, and a third write area having a fifth storage area in which logical block addresses are stored, and
   the control means controls writing of the data transferred from the host apparatus, into the first write area, the second write area or the third write area, in accordance with a command from the host apparatus instructing that the data transferred from the host apparatus be recorded.

2. The hybrid data-storage apparatus according to claim 1, wherein the control means controls the writing of record management information in the third write area in accordance with the command transferred from the host apparatus and instructing that the data transferred from the host apparatus be recorded, the management information used to manage the data to be written in the first write area and the second write area.

3. The hybrid data-storage apparatus according to claim 1, wherein the control means controls writing the data transferred from the host apparatus into the first write area and transfers, at a predetermined timing, the data written in the first write area to the second write area including the third write area, thereby freeing the first write area for more data.

4. The hybrid data-storage apparatus according to claim 1, wherein the control means effects writing of a head part of the data transferred from the host apparatus into the cache area of the nonvolatile memory and effects writing of the remaining part of the data into at least the cache area of the recording medium.

5. The hybrid data-storage apparatus according to claim 4, wherein the control means effects writing of all data transferred from the host apparatus, except for the head part of the data, into the cache area of the recording medium and the cache area of the nonvolatile memory, in parallel.

6. The hybrid data-storage apparatus according to claim 5, wherein
   the recording medium is a rotating recording medium, and
   the control means controls writing of the data transferred from the host apparatus into the cache area of the recording medium while a seek operation is performed on the recording medium.

7. The hybrid data-storage apparatus according to claim 1, wherein
   the second write area includes a fourth storage area other than the cache area of the nonvolatile solid-state memory, and
   the control means transfers the data written in the first write area to the second write area when the host apparatus fails to generate an access request within a predetermined time.

8. The hybrid data-storage apparatus according to claim 7, wherein, in order to move the data, the control means erases the data written in the cache area of the recording medium.

9. The hybrid data-storage apparatus according to claim 7, wherein in order to move the data, the control means effects the writing of the head part of the data into the fourth storage area and write the remaining data into at least the third write area.

10. The hybrid data-storage apparatus according to claim 9, wherein in order to move the data, the control means controls the writing of the data other than the head part, into the third write area and the fourth storage area in parallel.

11. The hybrid data-storage apparatus according to claim 7, further comprising a memory that stores a table that is used to manage the data transferred from the host apparatus as files, wherein
   the table is recorded in a prescribed area included in the second write area, and
   the control means reads the table recorded in the prescribed area into the memory in accordance with a mode-switching command supplied from the host apparatus, and searches the recording medium and the nonvolatile solid-state memory for empty areas, by referring to the table read into the memory.

12. The hybrid data-storage apparatus according to claim 11, wherein
   the files are composed of a plurality of super clusters, each being several times as large as a cluster, and
   the control means has a switching function effective to write the data transferred from the host apparatus into the recording medium or the nonvolatile solid-state memory, either in units of super clusters or in units of clusters, in accordance with a speed at which data is written into the recording medium and the nonvolatile solid-state memory.

13. The hybrid data-storage apparatus according to claim 1, wherein the control means compresses data and writes the data into the first area and restores the compressed data to initial state before the data is moved to the third storage area.

14. A hybrid data-storage method comprising the steps of:
   transferring data from a host apparatus to a cache area on a recording medium; and writing the data transferred from the host apparatus into at least a first write area, a second write area or a third write area in accordance with a command instructing that the data transferred from the host apparatus be recorded, wherein, the cache areas include the first write area composed of first and second storage areas for temporarily storing the data transferred from the host apparatus, the second write area having the third storage area to which data is transferred more slowly than to the first write area, and the third write area having a fourth storage area in which logical block addresses are stored, the first write area is provided on a recording medium and the cache area is provided in a nonvolatile solid-state memory, and the third write area logical block addresses are recorded in a prescribed area of the recording medium and a prescribed area of the nonvolatile solid-state memory.

15. A recording/reproducing system having a host apparatus and a hybrid data-storage apparatus that accesses a recording medium under control of the host apparatus, thereby to write and/or read data into and from the recording medium, the hybrid data-storage apparatus comprising:

a recording medium having a cache area for temporarily storing data transferred from a host apparatus;

a nonvolatile solid-state memory having a cache area for temporarily storing the data transferred from the host apparatus; and control means for controlling writing of the data transferred from the host apparatus, temporarily into the cache areas of the recording medium and the nonvolatile solid-state memory, wherein the cache areas include a first write area composed of first and second storage areas for temporarily storing the data transferred from the host apparatus, a second write area having a third storage area to which data is transferred more slowly than to the first area, and a third write area having a fourth storage area in which logical block addresses are stored, and the control means controls writing of the data transferred from the host apparatus, into the first write area, the second write area or the third write area, in accordance with a command from the host apparatus instructing that the data transferred from the host apparatus be recorded.

16. A hybrid data-storage apparatus comprising:

a recording medium having a cache area for temporarily storing data transferred from a host apparatus;

a nonvolatile solid-state memory having a cache area for temporarily storing the data transferred from the host apparatus; and a control section that controls writing the data transferred from the host apparatus, temporarily into the cache areas of the recording medium and the nonvolatile solid-state memory, wherein the cache areas include a first write area composed of first and second storage areas for temporarily storing the data transferred from the host apparatus, a second write area having a third storage area to which data is transferred more slowly than to the first write area, and a third write area having a fourth storage area in which logical block addresses are stored, and the control section controls writing of the data transferred from the host apparatus, into the first write area, the second write area or the third write area, in accordance with a command from the host apparatus and instructing that the data transferred from the host apparatus be recorded.

17. A recording/reproducing system having a host apparatus and a hybrid data-storage apparatus that accesses a recording medium under control of the host apparatus, thereby to write and/or read data into and from the recording medium, the hybrid data-storage apparatus having:

a recording medium having a cache area for temporarily storing data transferred from a host apparatus;

a nonvolatile solid-state memory having a cache area for temporarily storing the data transferred from the host apparatus; and a control section that controls writing of the data transferred from the host apparatus, temporarily into the cache areas of the recording medium and the nonvolatile solid-state memory, wherein, the cache areas include a first write area composed of first and second storage areas for temporarily storing the data transferred from the host apparatus, a second write area having a third storage area to which data is transferred more slowly than to the first area, and a third write area having a fourth storage area where logical block addresses are stored, and the control section controls writing of the data transferred from the host apparatus, into the first write area, the second write area or the third write area, in accordance with a command from the host apparatus instructing that the data transferred from the host apparatus be recorded.

* * * * *